(12) United States Patent
Hæggström et al.

(10) Patent No.: US 11,624,566 B2
(45) Date of Patent: Apr. 11, 2023

(54) METHOD FOR CLEANING OF A DEVICE

(71) Applicant: ALTUM TECHNOLOGIES OY, Helsinki (FI)

(72) Inventors: Edward Hæggström, Helsinki (FI); Ari Salmi, Helsinki (FI); Arto Klami, Helsinki (FI); Petri Myllymäki, Helsinki (FI); Timo Rauhala, Helsinki (FI)

(73) Assignee: ALTUM TECHNOLOGIES OY, Helsinki (FI)

( * ) Notice: Subject to any disclaimer, the term of this patent is extended or adjusted under 35 U.S.C. 154(b) by 388 days.

(21) Appl. No.: 16/763,444

(22) PCT Filed: Nov. 5, 2018

(86) PCT No.: PCT/FI2018/050803
§ 371 (c)(1),
(2) Date: May 12, 2020

(87) PCT Pub. No.: WO2019/097114
PCT Pub. Date: May 23, 2019

(65) Prior Publication Data
US 2020/0363147 A1    Nov. 19, 2020

(30) Foreign Application Priority Data

Nov. 14, 2017 (FI) ................................. 20176017

(51) Int. Cl.
*F28G 7/00* (2006.01)
*F28G 15/00* (2006.01)
(Continued)

(52) U.S. Cl.
CPC ............ *F28G 15/003* (2013.01); *B08B 9/027* (2013.01); *B08B 13/00* (2013.01); *F28G 7/00* (2013.01);
(Continued)

(58) Field of Classification Search
CPC ......... F28G 15/003; F28G 7/00; G06N 20/00; B08B 9/027; B08B 13/00; B08B 2209/005; B08B 2209/027; G05B 15/02
See application file for complete search history.

(56) References Cited

U.S. PATENT DOCUMENTS

| 4,375,991 A | 3/1983 | Sachs et al. |
| 6,290,778 B1 | 9/2001 | Zugibe |

(Continued)

FOREIGN PATENT DOCUMENTS

| DE | 102006041980 A1 | 3/2008 |
| JP | 2002-081635 A | 3/2002 |

(Continued)

OTHER PUBLICATIONS

International Search Report, dated Apr. 2, 2019, from corresponding PCT application No. PCT/FI2018/050803.
(Continued)

*Primary Examiner* — Sharidan Carrillo
(74) *Attorney, Agent, or Firm* — Nixon & Vanderhye

(57) ABSTRACT

Disclosed are methods for cleaning of devices, such as heat exchangers, in particular to methods wherein machine learning systems, such as trained neural networks are used for indicating the fouling status the during the cleaning processes.

20 Claims, 10 Drawing Sheets

(51) Int. Cl.
  *G06N 20/00* (2019.01)
  *B08B 9/027* (2006.01)
  *B08B 13/00* (2006.01)
  *G05B 15/02* (2006.01)

(52) U.S. Cl.
  CPC .............. *G05B 15/02* (2013.01); *G06N 20/00* (2019.01); *B08B 2209/005* (2013.01); *B08B 2209/027* (2013.01)

(56) References Cited

U.S. PATENT DOCUMENTS

| | | | |
|---|---|---|---|
| 8,534,144 B2 * | 9/2013 | Amir | G01N 29/44 73/609 |
| 2004/0059265 A1 | 3/2004 | Candy et al. | |
| 2006/0037399 A1 | 2/2006 | Brown | |
| 2007/0267176 A1 | 11/2007 | Song et al. | |
| 2008/0073063 A1 | 3/2008 | Clavenna et al. | |
| 2009/0270790 A1 | 10/2009 | Raghavan | |
| 2012/0055521 A1 | 3/2012 | Kim et al. | |
| 2017/0291044 A1 | 10/2017 | Zheng et al. | |
| 2019/0111457 A1 * | 4/2019 | Haeggström | B08B 3/12 |
| 2021/0222969 A1 * | 7/2021 | Sheptunov | F28G 15/003 |

FOREIGN PATENT DOCUMENTS

| | | | |
|---|---|---|---|
| KR | 20170022433 A | 3/2017 | |
| WO | WO-2017194839 A1 * | 11/2017 | B08B 17/02 |

OTHER PUBLICATIONS

International Search Report, dated Jun. 4, 2018, from corresponding Finnish application No. 20176017.

Wallhäußer et al.; Determination of cleaning end of dairy protein fouling using an online system combining ultrasonic and classification methods; Food Bioprocess Technology; Jan. 15, 2013; pp. 506-515; vol. 7, No. 2.

Ubeda et al.; Acoustic sensing and signal processing techniques for monitoring milk fouling cleaning operations; Engineering in Life Sciences; Sep. 9, 2015; pp. 67-77; vol. 16, No. 1.

Arnal et al., "Tunable time-reversal cavity for highpressure ultrasonic pulses generation: A tradeoff between transmission and time compression", Applied Physics Letters, 2012, vol. 101, pp. 064104-1-064104-4 (5 total pages).

Cohn et al., "Active Learning with Statistical Models", Journal of Artificial Intelligence Research, 1996, vol. 4, pp. 129-145.

Gal et al., "Bayesian Convolutional Neural Networks with Bernoulli Approximate Variational Inference", Under review as a conference paper at ICLR 2016, 2016, pp. 1-12.

Pu et al., "A Deep Generative Deconvolutional Image Model", Appearing in Proceedings of the 19th International Conference on Artificial Intelligence and Statistics (AISTATS) 2016, Cadiz, Spain, JMLR: W&CP, 2016, vol. 41, pp. 741-750.

Robin et al., "A 3D time reversal cavity for the focusing of high-intensity ultrasound pulses over a large volume", Physics in Medicine & Biology, 2017, vol. 62, pp. 810-824 (16 total pages).

Sarvazyan et al., "Time-Reversal Acoustic Focusing System as a Virtual Random Phased Array", IEEE Transactions on Ultrasonics, Ferroelectrics, and Frequency Control, Apr. 2010, vol. 57, No. 4, pp. 812-817.

Sohn et al., "Learning Structured Output Representation using Deep Conditional Generative Models", Advances in Neural Information Processing Systems 28 (NIPS 2015), 2015, pp. 1-9.

Kendall et al., "Bayesian SegNet: Model Uncertainty in Deep Convolutional Encoder-Decoder Architectures for Scene Understanding", arXiv:1511.02680v2 [cs.CV], 2016, pp. 1-11.

Kingma et al., "Semi-supervised Learning with Deep Generative Models", arXiv:1406.5298v2 [cs.LG], 2014, pp. 1-9.

Luong et al., "A compact time reversal emitter-receiver based on a leaky random cavity", Scientific Reports, 2016, 6:36096, DOI: 10.1038/srep36096, pp. 1-8.

* cited by examiner

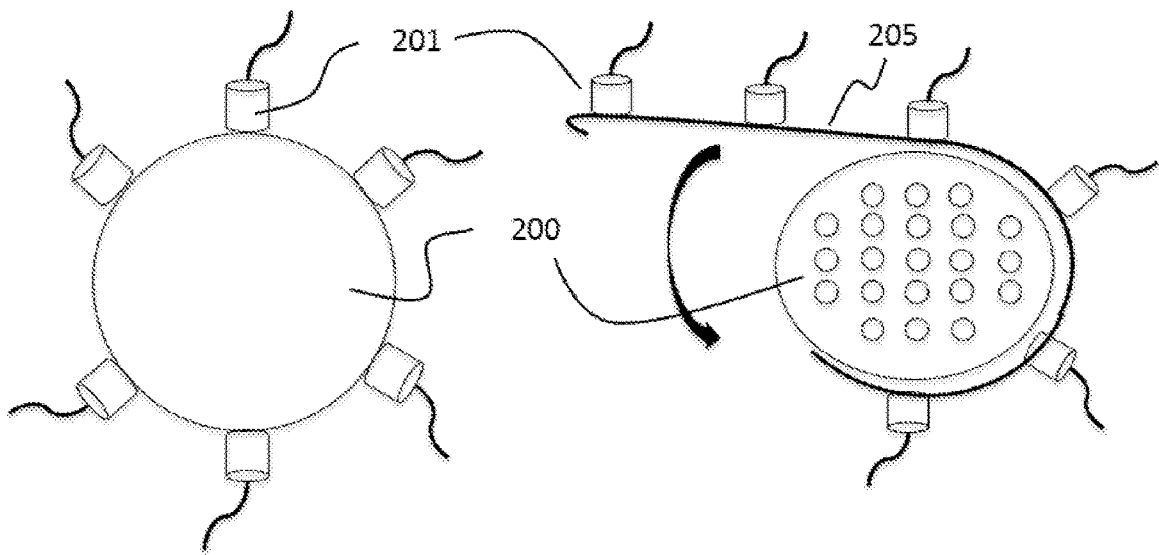
Figure 2a
Figure 2b
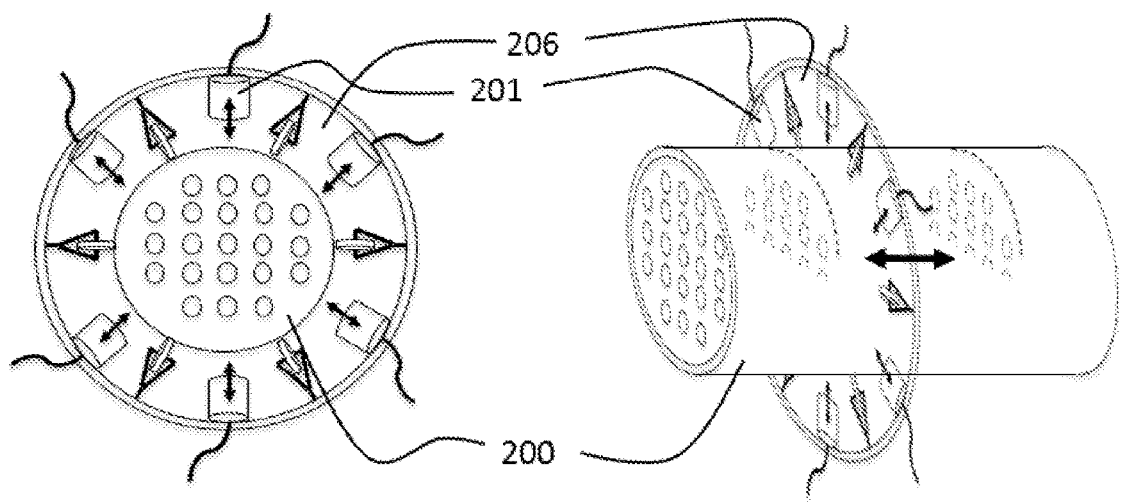
Figure 2c

METHOD FOR CLEANING OF A DEVICE

FIELD

The present invention relates to methods for cleaning of devices, such as heat exchangers, in particular to methods including the use of machine learning systems such as trained neural networks.

BACKGROUND

The cleaning of fouled heat exchanges presents a significant challenge to the maintenance and operation of e.g. chemical, petroleum, and food processes. Despite efforts in the design of processes and hardware to minimize fouling, eventually the intricate interior wall of the exchanger require cleaning to restore the unit to the required efficiency.

Heat exchangers are typically cleaned onsite by removing the exchanger and by placing the unit on a wash pad for spraying with high pressure water to remove foulants. Cleaning heat exchangers in an ultrasonic bath requires specially designed vessels that allow coupling sound into them and that are capable of holding sufficient fluid to affect the cleaning, and that feature specific design to allow easy removal of the foulant material from the immersed device.

US 2012055521 discloses a segmental ultrasonic cleaning apparatus configured to remove scales and/or sludge deposited on a tube sheet. The segmental ultrasonic cleaning apparatus includes a plurality of segment groups arranged in a ring shape on a top surface of a tube sheet along an inner wall of the steam generator, in which each segment groups includes an ultrasonic element segment and a guide rail support segment loosely connected to each other by metal wires located at a lower portion of the steam generator, such that ultrasound radiated from transducer in each of the ultrasonic element segments travels along the wall of the tube sheet, with the segment groups tightly connected in the ring shape by tightening the metal wires via wire pulleys of flange units.

US 2007267176 discloses a method wherein fouling of heat exchange surfaces is mitigated by a process in which a mechanical force is applied to a fixed heat exchanger to excite a vibration in the heat exchange surface and produce shear waves in the fluid adjacent to the heat exchange surface. The mechanical force is applied by a dynamic actuator coupled to a controller to produce vibration at a controlled frequency and amplitude that minimizes adverse effects to the heat exchange structure. The dynamic actuator may be coupled to the heat exchanger in place and operated while the heat exchanger is on line.

US2008073063 discloses a method for reducing the formation of deposits on the inner walls of a tubular heat exchanger through which a petroleum-based liquid flows. The method comprises applying one of fluid pressure pulsations to the liquid flowing through the tubes of the exchanger and vibration to the heat exchanger to affect a reduction of the viscous boundary layer adjacent to the inner walls of the tubular heat exchange surfaces. Fouling and corrosion were further reduced using a coating on the inner wall surfaces of the exchanger tube.

U.S. Pat. No. 4,375,991 discloses a method wherein a user is able to determine when a heat exchanger needs cleaning and when such cleaning has been satisfactorily accomplished. Accordingly, a tubular surface or probe, the external surface of which is constructed of a material similar to that of pipes of the heat exchanger, is disposed within the heat exchanger so that it is exposed to the same type of biofouling as the heat exchanger itself. The tubular surface is connected to a biofouling sensing means which includes instrumentation, well known in the art, for determining the heat exchanger capabilities of the tubular surface of probe. As a result, the biofouling sensing means can determine when the heat exchange between the tubular surface and the surrounding fluid environment has been reduced by biofouling. The information from the biofouling sensing means can then be directly fed to the microprocessor, which controls the functioning of the ultrasonic cleaning apparatus.

The state of art systems and devices for heat exchanger cleaning still face challenges, regarding proper cleaning of the internal structures of the heat exchanger without installing any probes into the device. Accordingly, there is still a need for further systems and methods for ultrasound cleaning of devises.

SUMMARY

The present invention is based on the observation that at least some of problems related to cleaning of internal structures of a device for holding fluid, such as a heat exchanger, can be avoided or at least alleviated by creating cavitation at predetermined positions within a device. According to the present invention the cavitation is created by mechanical waves, such as ultrasound waves, generated by transducers, wherein the waves are based on output analysis of the device structure. The cleaning process is controlled by using by using machine learning systems.

Accordingly, it is an object of the present invention to provide a method for cleaning a device holding fluid, the method comprising:
  positioning one or more transducers on, or in proximity of, outer wall of the device,
  determining one or more target points within the device,
  producing emitter instructions,
  instructing, based on the emitter instructions, the one or more transduces, and
  the one or more transducers emitting, based on the instructing, mechanical waves towards the one or more target points.

According to the method of the present invention, the emitter instructions are produced by machine learning system comprising mechanical waveform data about a device to be cleaned. The mechanical waveform data comprises simulated time-reversed mechanical waveform data, preferably simulated time-reversed mechanical waveform data from the one or more target points towards the one or more transducers.

It is another object of the present invention to provide a computer program product which comprises program code means stored on a computer-readable medium, whose code means are arranged to perform all the steps of any of claims 1-18 when the program is run on a calculating device, such as a computer.

Further objects of the present invention are described in the accompanying dependent claims.

Exemplifying and non-limiting embodiments of the invention, both as to constructions and to methods of operation, together with additional objects and advantages thereof, are best understood from the following description of specific exemplifying embodiments when read in connection with the accompanying drawings.

The verbs "to comprise" and "to include" are used in this document as open limitations that neither exclude nor require the existence of unrecited features. The features recited in the accompanied depending claims are mutually freely combinable unless otherwise explicitly stated. Furthermore, it is to be understood that the use of "a" or "an", i.e. a singular form, throughout this document does not exclude a plurality.

BRIEF DESCRIPTION OF DRAWINGS

FIGS. 1 and 2 show non-limiting exemplary systems for use in the method of the present invention.

DESCRIPTION

Figure 1:
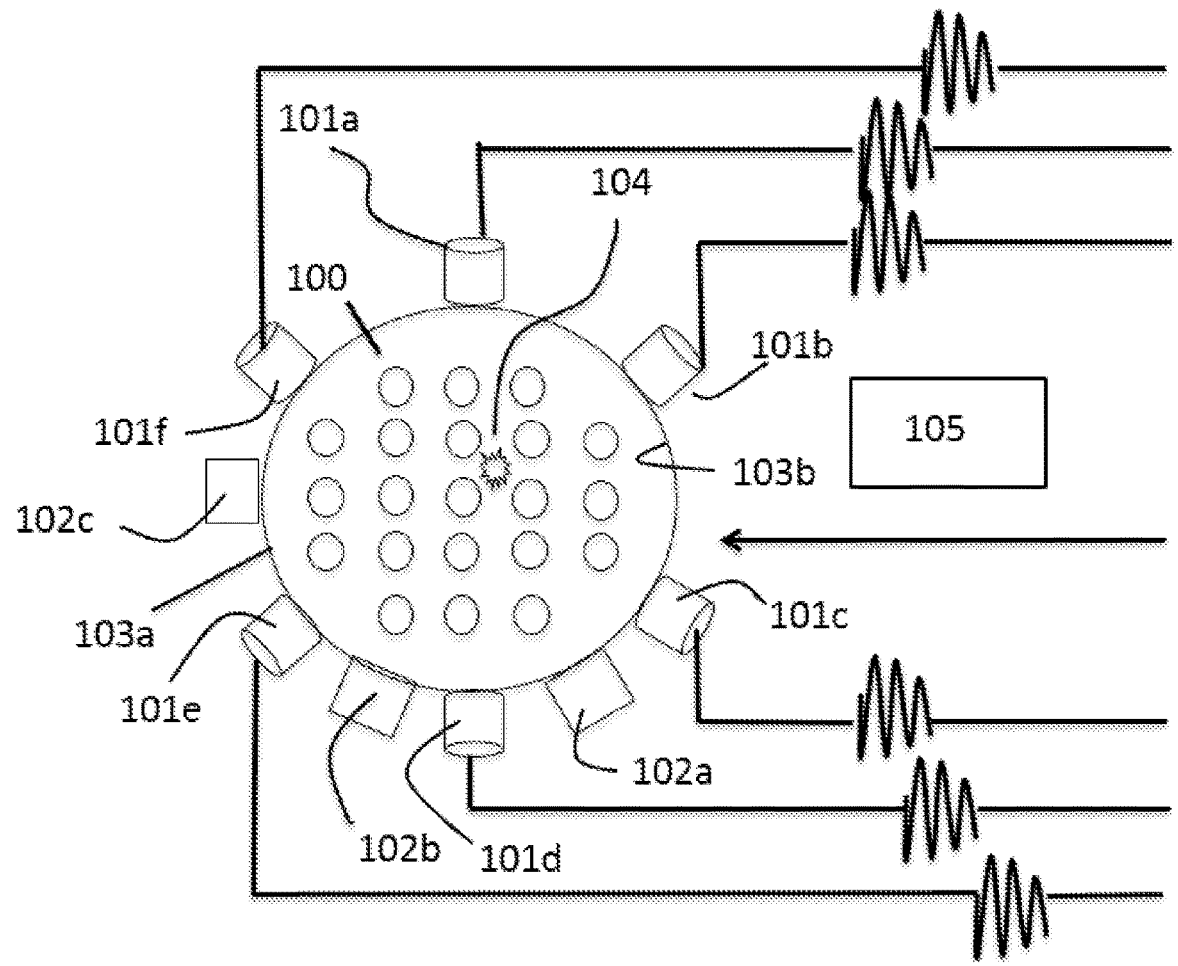

According to one embodiment, the method of the present invention for cleaning a device for holding fluid comprises
positioning one or more transducers on, or in proximity of, outer wall of the device,
determining one of more target points within the device,
producing emitter instructions, and
instructing, based on the emitter instructions, the one or more transduces, and
the one or more transducers emitting, based on the instructing, mechanical waves towards the one or more target points.

According to the present invention, the producing is performed by using a machine learning system. Exemplary machine learning systems suitable for the method are neural networks and probabilistic graphical systems such as Bayesian model. A particular machine learning system is a deep neural network.

As defined herein, mechanical waves are waves that require a medium for the transfer of their energy to occur. Particularly suitable mechanical waves are ultrasound waves with a frequency of ca 20 kHz-2 GHz.

As defined herein, fluids are a subset of the phases of matter and include liquids, gases, plasmas and, to some extent, plastic or organic solids. A particular fluid is liquid. Exemplary liquids are water and oil.

The machine learning systems, such as deep neural networks comprise mechanical waveform data which is used for producing the emitter instructions.

The mechanical waveform data used by the machine learning system may be derived at least partially from another device to be cleaned or from plurality of other devices to be cleaned. The mechanical waveform data may also include simulated time-reversal mechanical waveform data.

According to a preferable embodiment the machine learning system utilizes time-reversal techniques for producing the emitter instructions. According to one embodiment this comprises providing simulated time-reversal waveform data from a device, and incorporating the simulated time-reversal waveform data to the machine learning system. The simulated time-reversal waveform data can be derived for the device to be cleaned or from another device resembling the device to be cleaned. For example, if the device to be cleaned is a heat exchanger, the simulated time-reversal waveform data can be obtained by using another heat exchanger of the same type.

According to another embodiment the simulated time-reversal waveform data comprises simulated time-reversal mechanical waveform from the one or more target points towards the one or more transducers of the device to be cleaned.

The advantage of the use of time-reversal mechanical waves is that it allows focusing mechanical waves, e.g. sound to an arbitrary location inside a device to be cleaned. According to an exemplary embodiment, focusing is achieved by transmitting a time-reversed version of the acoustic signal that would be observed at the transducer if an imaginary phantom source at the desired location would send a short and intense pressure signal. The necessary knowledge (what signals to transmit by each transducer) can be achieved by computer simulation, e.g. by simulating the ultrasonic field propagating inside the pipe with FEM based on a known clean internal structure.

According to an embodiment, CAD and FEM software are used to create a map of a device to be cleaned. This can be performed by running forward propagation, in FEM, for time-reversed signals, to create a lookup table relevant to the device to be cleaned as well as to the transducer specification and positioning. This allows to place the cleaning spot at any spatial location needed inside the device. It also permits to distort in silico the location and shape of the internal structures. Furthermore, it allows to create a lookup table relevant to dirt/fouling being accumulated inside the structure (amount and location). The acoustic parameters for the fouling, can be obtained from real world experiments.

A further advantage is that the machine learning system is able to learn how to produce emitter instruction even if the ground truth differs from the drawing. In other words, the cleaning process proceeds smoothly even in the situation when one or more of the internal structures of the device are perturbed, such as they contain fouling or the internal structure has been damaged. In these situations, e.g., the blueprint of the device differs from the real situation.

According to one embodiment, the machine learning system, such as a neural network, is trained to model the received mechanical waves as a function of internal structure and/or fouling in the device. The entire acoustic field corresponding to the perturbed structures does not to be solved. Instead it may be modelled how the time-reversal solution computed (simulated) for the idealized clean structure needs to be modified to maximize the mechanical wave pressure at the preferred cleaning site. This makes the problem feasible since it reduces computational complexity.

According to another embodiment, at least one of the one or more transducers emit one or more measurement pulses towards the one or more target points and receive one of more reflecting measurement pulses from the one or more target points, and/or at least one of the one or more transducers receive one or more echoes of the plurality of mechanical waves emitted towards the one or more target points. The one or more reflecting measurement pulses and/or the one or more echoes, are processed, by using the machine learning system, such as a neural network comprising non-linear mechanical wave processing algorithms to indicate fouling status of the device at the one or more target points. Exemplary non-linear mechanical wave processing algorithm comprises information on reflecting measurement pulses and echoes. The one or more transduces are then instructed by using the fouling status.

According to one embodiment the one or more transducers are multifunctional transducers: they are configured to emit a plurality of mechanical waves, receive and record echoes of the plurality of mechanical waves emitted, send one or more measurement pulses towards the one or more target points, and receive reflected measurement pulses from the one or more target points.

According to one embodiment the one or more transducers are also configured to determine mechanical waves along the outer wall of the device to be cleaned. According to an exemplary embodiment the determining comprises determining amplitude and/or frequency of mechanical waves, such as Lamb waves along the outer wall of the device, According to another embodiment, the one or more transducers emit mechanical waves towards the one or more target points and receive echoes of the emitted mechanical waves.

According to another embodiment, the one or more transducers emit mechanical waves and measurement pulses towards the one or more target points and receive measurement pulses reflecting from the one or more target points.

According to still another embodiment, the method comprises the use of at least two different types of transducers, namely one or more first transducers and one or more second transducers. According to an exemplary embodiment, the first transducers emit mechanical waves towards the one or more target points, and the second transducers emit and receive measurement pulsed towards and from the one or more target points, respectively.

According to still another embodiment, the first transducers emit mechanical waves towards the one or more target points, and receive echoes of the emitted mechanical waves, while the second transducers emit and receive measurement pulsed towards and from the one or more target points, respectively.

An exemplary system for use in the method of the present invention is shown in FIG. 1. According to some of the following non-limiting examples such as the one shown in FIG. 1, the one of more transducers are marked as first transduces, and second transducers for clarity.

According to an exemplary embodiment, the system for cleaning a device 100 comprises the first transducers 101a-f and the second transducers 102a-c to be positioned on, or in the proximity of, the outer wall/surface 103a of the device. The inner wall/surface of the device is marked with a reference number 103b. An exemplary target point is marked with a reference number 104. The system comprises also transducer controlling means 105 adapted to provide emitter instructions to the one or more transducers.

Exemplary non-limiting transducer installations are shown in FIG. 2. In FIG. 2a the transducers 201 are screwed, bolted or glued onto a heat exchanger 200. FIG. 2b discloses an embodiment wherein the transducers 201 are attached with a clamp-on contraption e.g. in the aid of a belt structure 205 allowing easy installation. FIG. 2c discloses an embodiment wherein the transducers 201 are attached on a positioning system 206 for moving the transducers in the proximity of the outer wall of device 200. The double headed arrow in FIG. 2c represents movement of the positioning of the transducers along the device.

According to an exemplary embodiment, the one or more transducers are ultrasonic Langevin transducers that are adapted to be electrically and physically impedance matched to the outer surface of the device, such as to the outer wall of a heat exchanger. Particular care is on allowing transmission of sufficiently broadband transmission signals to allow efficient coded waveforms to be used. This can be done by using broadband electrical and mechanical matching techniques known in the art. For example, the impedance matching LC circuit is designed to have its resonance slightly above that of the attached transducer. This, in turn, permits sufficient bandwidth for code waveforms (e.g. 1-50% bandwidth, relative to the center frequency) and high ultrasonic power (>1 W/cm$^2$) at the same time. Although some of the embodiments disclosed herein show separate first and second transducers, it is also possible to use multifunctional transducers e.g. transducers that are adapted to emit mechanical waves for cleaning and for sending and receiving the measurement pulses.

According to another embodiment, the one of more transducers are adapted to be positioned in the proximity, typically 1-10 mm, from the outer wall of the device to be cleaned. The term in proximity is to be understood as a transducer that is not adapted to be in permanent physical contact with the outer surface of the device. According to this embodiment, laser ultrasonic excitation may be applied. The laser ultrasonic excitation allows using the system without contacting the outer wall physically. Accordingly, focused towards the outer wall, the light is absorbed and creates a stress field. The stress field propagates in the target in a manner similar to the mechanical waves described above. The principle of laser ultrasonic excitation is known in the art.

According to an exemplary embodiment, the cleaning process is performed by the one or more first transducers which emit plurality of mechanical waves towards one or more target points within the device.

According to a preferable embodiment, during the cleaning process, at least one of transducers emit one of more measurement pulses towards the one or more target points. According to an exemplary embodiment the measurement pulse is a mechanical wave, such as an ultrasound wave, length of the pulse duration is preferably ≤100 ms, more preferably 0.1-100 ms. An exemplary pulse duration is 10 ms.

According to an exemplary embodiment, at least one of the one or more transducers receives one measurement pulse, typically an ultrasonic pressure, reflected from the one or more target points. Each transducer records a brief time series of the ultrasonic pressure, providing a raw measurement series (e.g. 10,000 observations per channel; i.e. per transducer). Since each measurement lasts for only a few milliseconds, such measurements can be performed repeatedly during the cleaning process.

According to another exemplary embodiment, the signal data corresponding to a single measurement pulse, but consisting of multiple channels corresponding to multiple transducers (i.e. ultrasonic pressure received at distinct locations on the device), is fed into a machine learning system that is trained to output an indicator of the fouling status of the device. According to an exemplary embodiment, the model supports alternative indicators for the status:

a. a real-valued scalar variable indicating the total amount of fouling
b. a binary variable indicating that the structure is either dirty or clean
c. collection of K binary or real-valued variables indicating the dirty/clean status of total amount of fouling at the surface of K internal structure elements
d. spatial heat map of fouling at distinct locations inside the structure A preferable machine learning system for the fouling status analysis is a deep neural network, in particular a recurrent neural network that combines LSTM layers (long short-term network) and feed-forward layers. The model is designed to capture temporal dependencies between reflected waveforms detected by the different transducers, and it can do this based on the raw signal inputs with no feature engineering. According to a particular embodiment, the system is trained by minimizing a loss function specific to the choice of the fouling indicator listed above.

Figure 3:
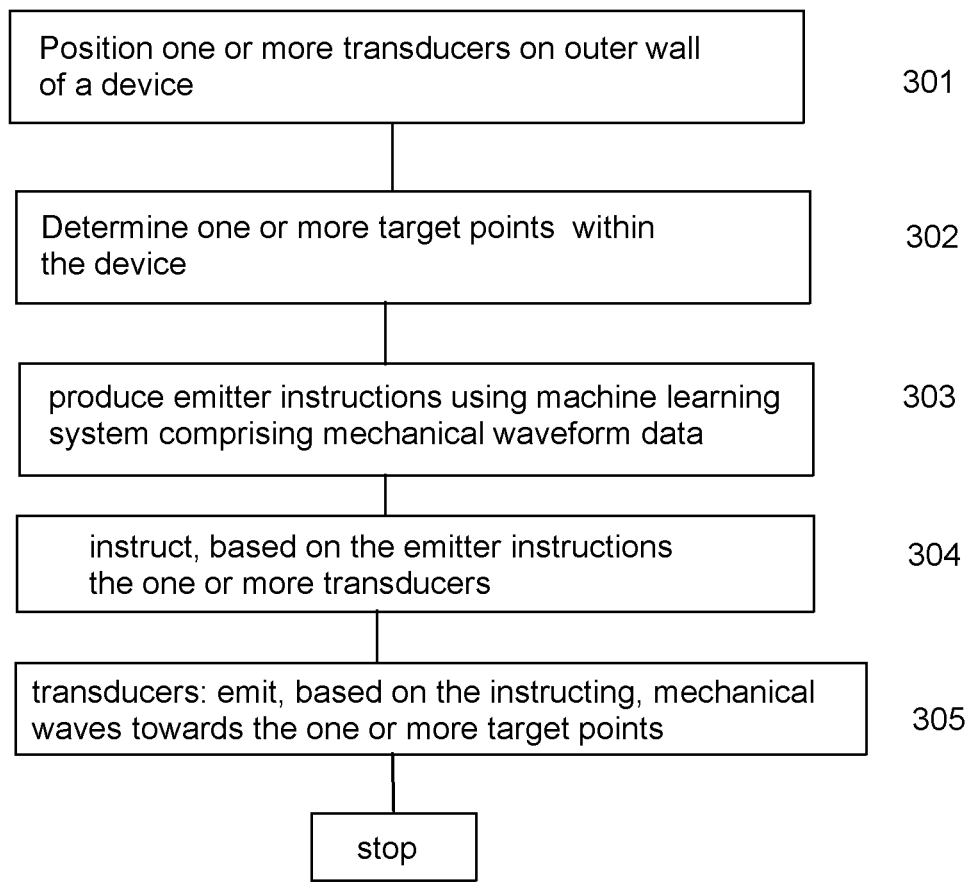
FIGS. 3-6, and 8 show non-limiting exemplary flow charts of methods of the present invention for cleaning a device holding fluid.
Figure 4:
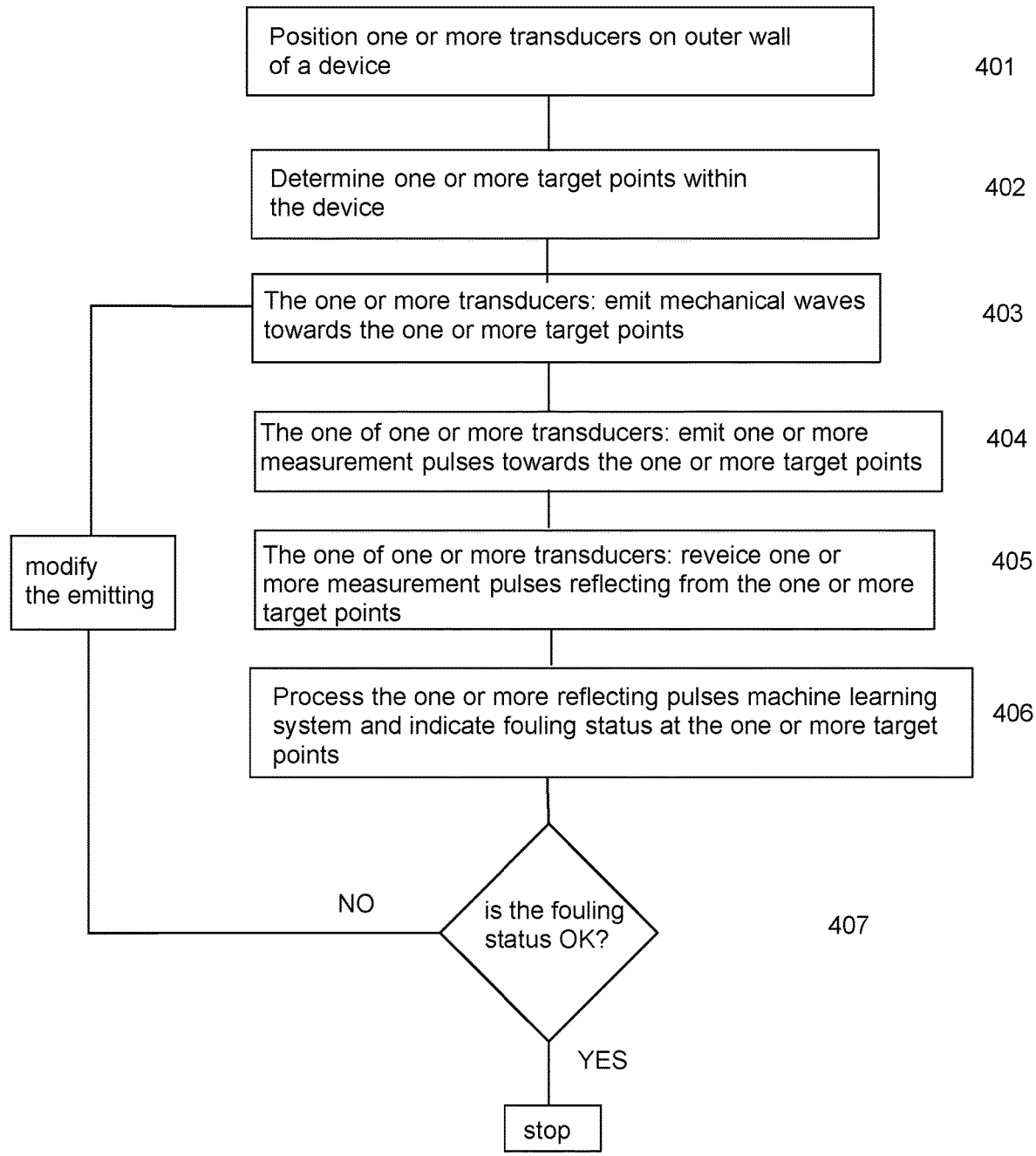

A flow chart of an exemplary non-limiting method of the present invention is shown in FIG. 3. The method includes the following actions:

action 301: position one or more transducers on outer wall of a device action 302: determine one or more target points within the device action 303: produce emitter instructions using machine learning system comprising mechanical waveform data.

action 304: instruct, based on the emitter instructions the one or more transducers action 305: transducers: emit, based on the instructing, mechanical waves towards the one or more target points A flow chart of another exemplary non-limiting method of the present invention is shown in FIG. 4. The method includes the following actions:

action 401: position one or more transducers on outer wall of a device action 402: determine one or more target points within the device action 403: the one or more transducers: emit plurality of mechanical waves towards the one or more target points action 404: the one or more transducers: emit one or more measurement pulses towards the one or more target points action 405: the one or more transducers: receive one or more measurement pulses reflected from the one or more target points action 406: process the one of more reflecting pulses using a mechanical learning system and indicate fouling status as the one or more target points action 407: instruct the one or more transducers based on the fouling status If the fouling status is acceptable, the one or more transducers may be instructed to stop emitting. If the fouling status is not acceptable, the one or more transducers are instructed to continue emitting or to modify emitting. According to one embodiment the modifying comprises changing the cleaning site, i.e. the one or more target points. The level of acceptable fouling status can be determined by an operator or by the machine learning system.

Figure 5:
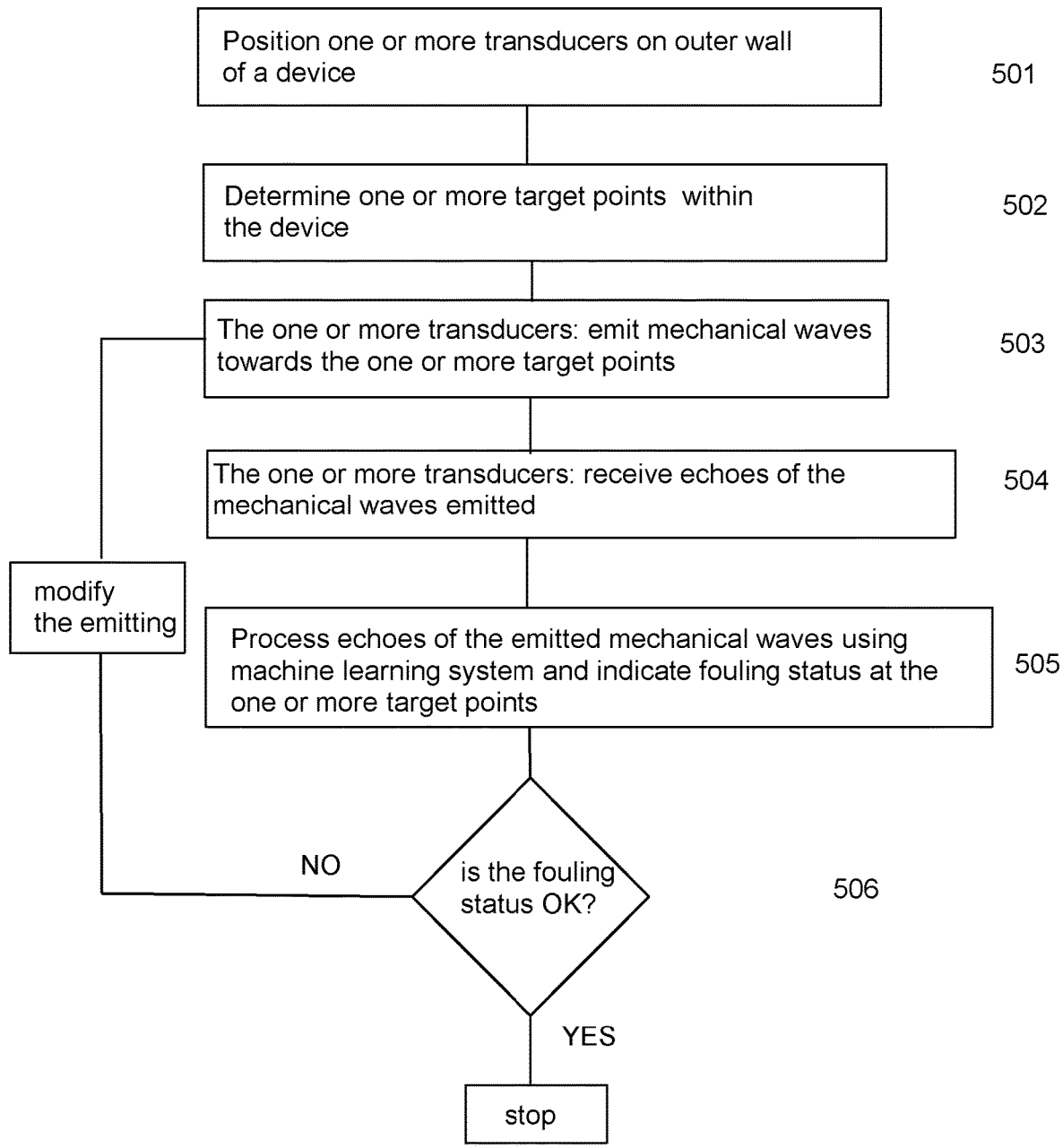

A flow chart of another exemplary non-limiting method of the present invention is shown in FIG. 5. The method includes the following actions:

action 501: position one or more transducers on outer wall of a device action 502: determine one or more target points within the device action 503: the one or more transducers: emit mechanical waves towards the one or more target points action 504: the one or more transducers: receive echoes of the waves emitted towards the one or more target points action 505: process echoes of the mechanical waves using machine learning system and indicate fouling status at the one or more target points action 506: instruct the one or more transducers based on the fouling status.

If the fouling status is acceptable, the one or more transducers are instructed to stop emitting. If the fouling status is not acceptable, the one or more transducers are instructed to continue emitting or to modify emitting. According to one embodiment the modifying comprises changing the cleaning site, i.e. the one or more target points. The level of acceptable fouling status can be determined by an operator or by the machine learning system.

Figure 6:
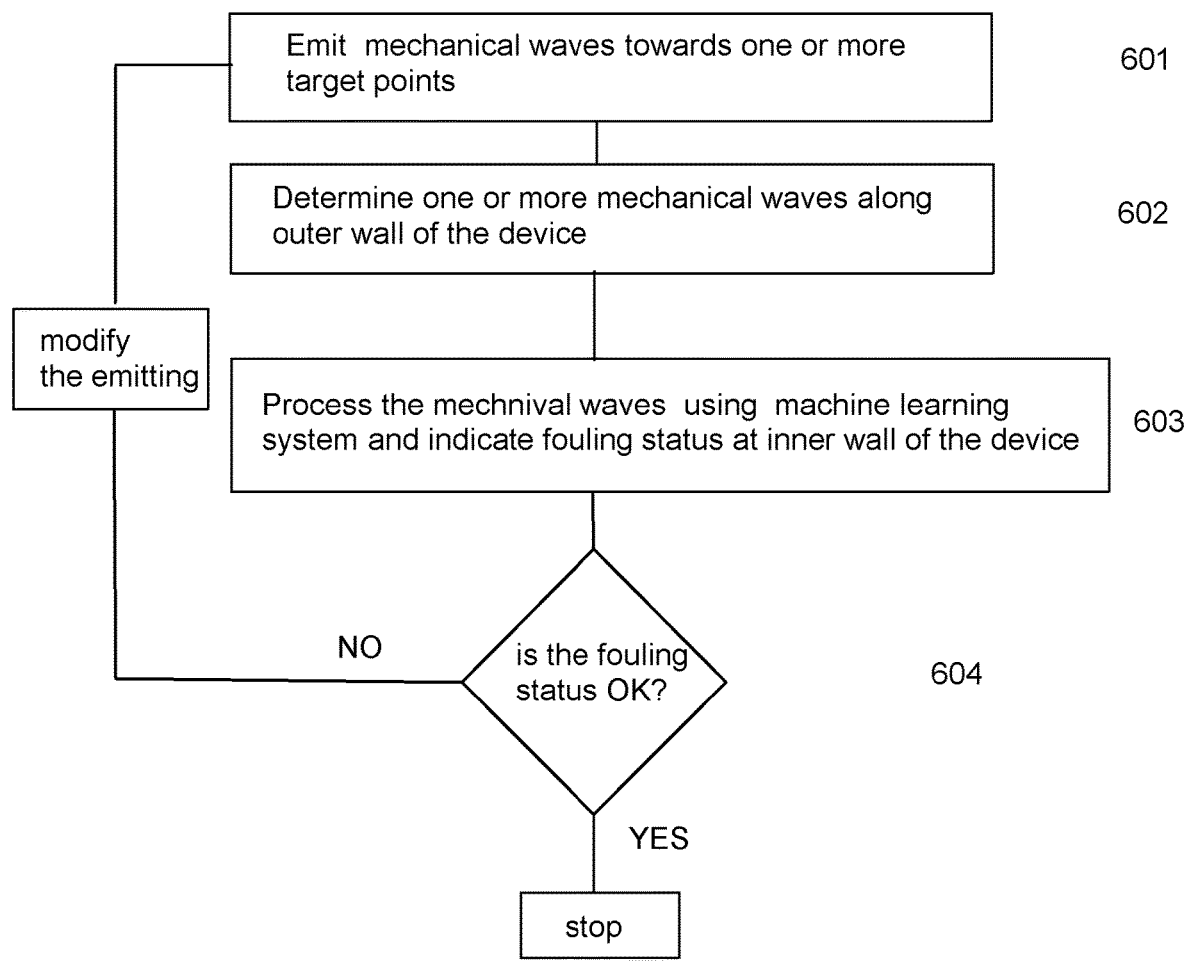

According still to another embodiment the method further comprises determining fouling on the inner surface of the device. This can be achieved by measuring changes in amplitude and/or frequency of mechanical waves, such as the Lamb waves, in the outer surface of the device during cleaning process of the device. According to this embodiment the processing comprises actions as depicted in FIG. 6:

action 601: emit one or more mechanical waves towards the one or more target points action 602: determine mechanical waves along the outer wall of the device action 603: process the mechanical waves using machine learning system and indicate fouling status on the inner wall of the device action 604: instruct the one or more transducers based on the fouling status If the fouling status is acceptable, the one or more transducers are instructed to stop emitting. If the fouling status is not acceptable, the one or more transducers are instructed to continue emitting or to modify emitting.

According to an exemplary method of the present invention, the machine learning system, in particular, a neural network comprising non-linear mechanical waveform processing algorithms utilizes one or more of: reflected measurement pulses, echoes from the emitted plurality of emitted mechanical waves, amplitude and/or frequency of mechanical waves, such as Lamb waves, changes in amplitude and/or frequency of mechanical waves, such as Lamb waves. According to a preferable embodiment the neural network gives rise to an estimation of fouling status of the device, and produces emitter instructions to the one or more transducers emitting the mechanical waves towards the one or more positions cleaned based on the fouling status learned.

According to an exemplary embodiment the instructing includes one or more of the following:

move the one or more transducers on, or in proximity of the outer wall of the device.

move the one or more target points.

modify one of more of: waveform shape, waveform focus point, waveform duration, waveform strength.

terminate the emitting.

terminate the emitting when the fouling status receives a predetermined value.

move the one or more the one or more transducers on, or in proximity of the outer surface of the device when the fouling status receives a predetermined value.

move the one or more target points when the fouling status at the one or more target points receives a predetermined value.

determining the number of the one or more transducers used for cleaning determining the positions of the one or more transducers on, or in proximity of the outer surface of the device changing the shape of the one or more target points (e.g. size, and form)

changing the emitting as a function of one or more of: temperature of the one or more transducers, temperature of the device, temperature of the fluid in the device.

Figure 7:
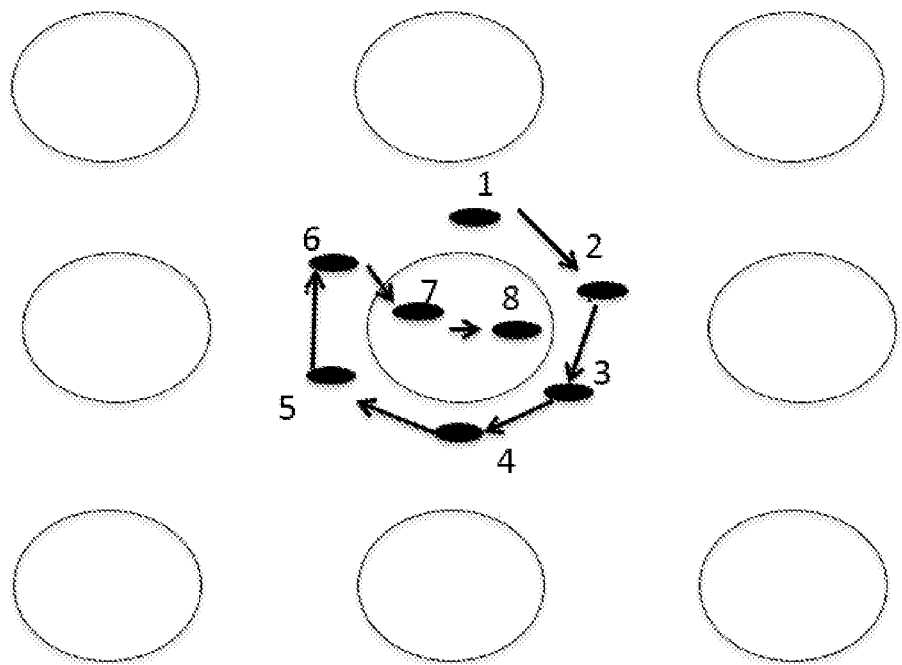
FIG. 7 shows an exemplary nonlimiting method according to the present invention wherein the focal point is moved during the cleaning process.

An exemplary method wherein the target point and thus also the focal point of the mechanical waves emitted by the one or more first transduces is shown in FIG. 7. Accordingly, the focal point is moved from (1) to (2) etc. when it is verified that the fouling status at particular positions within the device is sufficient.

Figure 8:
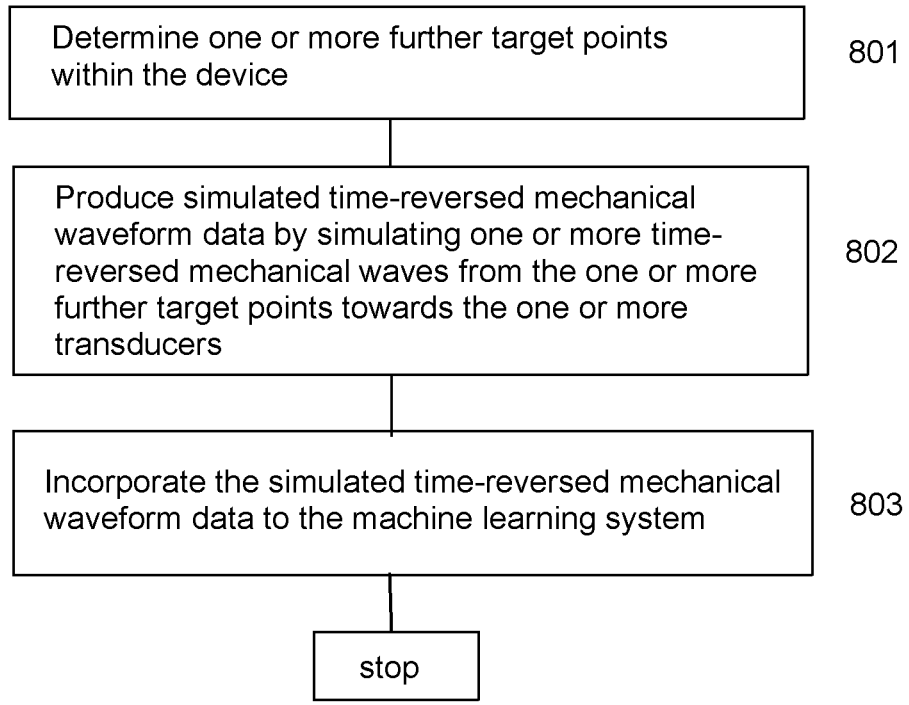

According to a preferable embodiment, instructing for moving the one or more target points to a further one of more target points comprises the following actions as depicted in FIG. 8:

action 801: determine one or more further target point within the device action 802: produce simulated time-reversal waveform data by simulating time-reversal mechanical waveform from the one or more further target points towards the one or more transducers, action 803: incorporate the simulated time-reversal waveform data to the machine learning system.

The advantage of the incorporating simulated time-reversal mechanical waveform data to the machine learning system, such as a neural network, is that the moving of the one or more transducers or the use of phased arrays can be avoided.

The use of time reversal techniques requires often a large number of transducers to be able to accurately position the focal spot of the system to a pre-determined location. To achieve high power at the focal spot, power ultrasonic transducers may have to be used, which present challenges due to their limited bandwidth. To reduce the number of transducers required, time reversal through a multiple scattering media can be employed, which has been shown to decrease the number of transducers required to obtain time reversal focus (Sarvazyan et al., IEEE Transactions on Ultrasonics, Ferroelectrics, and Frequency Control, vol. 57, no. 4, 2010, pp. 812-817). Furthermore, time reversal cavities, such as those used by Arnal et al. (Applied Physics Letters 101, 2012, pp 064104 1-4) and Robin et al., (Phys. Med. Biol. 62, 2017, pp, 810-824) have been shown to increase the ultrasonic wave amplitude at the focus (up to 20 MPa with 2 kW input electrical power) while allowing the focal spot to be steered in 3D without physically moving the transducers. Luong et al. (Luong et al. Nature, Scientific Reports |6:36096|DOI: 10.1038/srep36096, 2016) showed that an acoustic diffuser can be used as such a time reversal cavity to further reduce the number of transducers required.

As defined herein an ultrasonic chaotic cavity is a waveguide with a chaotic geometry, which breaks possible symmetries and generates virtual transducers for time reversal via internal reflections. An exemplary chaotic cavity transducer that is suitable for the method of the present invention comprises a combination of piezoelectric (PZT) ceramic attached to a cavity of chaotic shape. An applied source signal to the PZT ceramic generates a wave propagating in the cavity. Each time the propagating wave in the cavity arrives at the boundary between the cavity and the device to be cleaned, part of the incident energy is reflected and continues to engender multiple reflections on the other boundaries of the cavity, whereas the other part of the energy is transmitted in the device.

According to one embodiment the instructing in the method of the present invention is performed by a transducer controlling means. An exemplary transducer controlling means is a computer system which is adapted to execute emitter instructions to the one or more transducers. According to one embodiment the emitter instructions comprise data obtained by simulating time-reversal mechanical waves from one or more target points within the device. According to one embodiment, the method comprises simulating time-reversal mechanical waves from one or more predetermined target points within the device to be cleaned, preferably also determining waveform shape of the excitation waves based on the simulation and to transferring determined waveform shape (i.e. transmit codes) to the one or more transducers. According to another embodiment, the simulated time-reversal mechanical waveform data related to a device to be cleaned is stored in the memory of the computer system. According to this embodiment, the simulation is performed prior to the actual cleaning process. According to a preferable embodiment, the transducer controlling means comprises predetermined library of time-reversal mechanical wave data related to one or more devices to be cleaned.

According to one embodiment the instructing involves also processing the one or reflecting measurement pulses and/or the one or more echoes, using a machine learning system, such as neural network comprising non-linear measurement pulse and/or echo processing algorithm, to indicate fouling status of the device at the one or more target points, and instructing the one or more transduces using the fouling status. According to one embodiment the neural network is based on forward simulations. Accordingly, the neural network is trained to model the received signals as a function of internal structure and/or fouling. According to this embodiment, the entire acoustic field corresponding to the perturbed structures does not to need to be solved. Instead, it is modelled how the time-reversal solution computed (simulated) for the idealized clean structure needs to be modified to maximize the sound pressure at the preferred cleaning site. This makes the problem feasible since it reduces computational complexity. The supervision signal necessary to train the model is provided by the pressure amplitude in the targeted spot. This pressure is determined by running a FEM simulation using the signal proposed by the network as a phantom source. The model needs to map the time series recorded by the transducers to time-reversed signals. Initially, the sensor signals are mapped through a series of convolutional layers and latent features that characterize the perturbation in structure (amount and position of dirt) are extracted. Then the perturbed time-reversed signal is reconstructed by using stochastic deconvolution [Y. Pu, X. Yuan, A. Stevens, C. Li, L. Carin. A deep generative deconvolutional image model, In proceedings of Artificial Intelligence and Statistics (AISTATS), 2016]. The core effort is on reducing the high computational cost of obtaining training data, by:

1. Bayesian inference across the model parameters, building on Bayesian convolutional networks [Y. Gal, Z. Ghahramani. Bayesian Convolutional Neural Networks with Bernoulli Approximate Variational Inference, arXiv: 1506.02158, 2015] and encoder-decoder networks [A. Kendall, V. Badrinarayanan, R. Cipolla. Bayesian SegNet: Model Uncertainty in Deep Convolutional Encoder-Decoder Architectures for Scene Understanding, arXiv:1511.02680, 2015], with state-of-the-art performance in small data regime.

2. Design of the network structure based on prior physical knowledge of relevant features of the signals (frequency content, amplitude, location of echoes, phase, width of echoes) and existing literature of best network architectures for other kinds of short time-series data.

3. Active learning [D. A. Cohn, Z. Ghahramani, M. I. Jordan. Active learning with statistical models, Journal of Artificial Intelligence Research 4:129-145, 1995]; the model requests the simulator to provide training feedback for conditions (foul configuration, structural deformations, target location) and proposed time-reversed signals to maximize the expected utility of the new training label.

An important practical detail is that FEM provides the entire ultrasonic field inside the pipe, and hence to study the effect of transducer specifications in achievable (bandwidth, nonlinear distortion, number of transducers, location, signal rate) on the accuracy of the model without requiring new simulations.

According to one embodiment, data for training the machine learning system comes with scarce labels: for each experiment spatial distribution of fouling is known at the beginning of the experiment, and at the end of the cleaning process (e.g. by opening the device and inspecting). Between these extreme cases the true fouling state is unknown since it cannot be observed during the process. Only a small fraction of the instances is therefore labelled, with possibility of obtaining uncertain labels for other measurements using CODA signals and dynamic focusing. This core challenge is addressed by using semi-super learning [D. P. Kingma, D. J. Rezende, S. Modamed, M. Welling. Semi-Supervised Learning with Deep Generative Models, in Advances in Neural Information Processing Systems, 2014] and by probabilistic treatment of the output structure:

1. The cleaning process is monotonous (fouling is only removed, never added) and prior information is available about how cleaning happens inside the structure in typical scenarios. 2. Progressing from simple output representations (univariate measure of the volume of total fouling, identification of presence of fouling at discrete locations on the surface of the internal structure) to a full spatial map. This allows first solving simpler regression and multi-task problems that already provide a solution for determining when to stop cleaning. Deep conditional generative models [K. Sohn, H. Lee, X. Yan. Learning Structured Output Representation using Deep Conditional Generative Models, in Advances in Neural Information Processing Systems 28, 2015] can be used to generate the full spatial map that is required for determining where to target the cleaning next.

3. Spatial modeling of fouling density can be used to regularize the spatial maps by combining informative priors on fouling distribution (internal structure surfaces, vertical location in the internal structures) with spatial smoothness assumptions (e.g. Gaussian process models).

According to an exemplary embodiment, the model described can be interpreted as complex non-linear parametric function that maps the inputs (e.g. 40,000 real-valued measurements) to the output (e.g. single real-valued variable indicating the total amount of fouling). It is constructed by combining a large number of simple computational units, each of which reads in some inputs, multiplies them with some weights and then produces an output by taking a sum of these computations and passing it through a pre-specified univariate non-linear function (e.g. rectified linear function or sigmoid function). These outputs are then used as inputs for other layers of computation in order to model complex functions.

The behavior of this function depends both on the (i) machine learning system, such as neural network structure and (ii) the actual values given for the weights. These weights together to form the parameters of the model, and by modifying these parameters the system can be trained to approximate any reasonable function from the inputs to the outputs. Accordingly, the machine learning system can be trained to output the amount of fouling given the raw signal measurements.

According to one embodiment the training is done by using an iterative optimization process. The training algorithm takes as input a collection of (a) N pairs of inputs and known outputs, (b) the pre-specified network structure, (c) initial values for the parameter, and (d) a learning goal. The learning goal is provided by defining a loss function that measures similarity between the model outputs and the desired true output. For the simplest case of modeling the total amount of fouling, mean-square error between the predictions and true outputs can be used. The initial parameter values are determined randomly, and hence before training the model outputs are non-sensible; they do not resemble the real outputs in any way.

The training is carried out by optimization. The goal is to find parameter values that minimize the chosen loss function, and this is in practice carried out by stochastic gradient-based optimization algorithms. During training the to the system is shown repeatedly shown a small collection of training examples (called 'mini-batch' in technical terminology) and computed the derivative of the loss with respect to all parameters (called 'gradient') of the system. The system parameters are then modified slightly towards the direction of negative gradient; this means the system now provides outputs that result in slightly lower loss for the current training examples. This process is repeated iteratively until the loss reaches a satisfactory level; at this point the system has been trained to approximate the mapping from the inputs to the outputs. Typically, the machine learning system is trained for hundreds or 'epochs', meaning that every available training instance is shown for the system hundreds of times.

The optimization as described above is a simplification of the actual procedure, ignoring practical details that are important for making sure that the system is accurate also when making predictions for signals not available during training. This is achieved by regularization techniques and use of loss functions that account for uncertainty in the system parameters. To verify that the system is indeed accurate for scenarios not seen during the training process, the training and evaluation is carried out so that only a subset of the experiments are used for training the system whereas some are left out to be used for validating the accuracy on fresh instances.

Another practical detail concerns lack of ground truth data for the recordings during an ongoing cleaning process. This is solved by modeling the outputs for some of the training instances as further parameters to be optimized over, and by using a specific loss function that tells the network to additionally model the unknown outputs as a smooth monotonously decreasing function during the cleaning process.

According to one embodiment the present invention concerns a computer program product which comprises program code means stored on a computer-readable medium, and wherein the program is adapted to control a positioning system adapted to position or move the transducers, and to instruct the transducers to emit mechanical waves to perform all the steps of the method of the present invention when the program is run on a calculating device, such as a computer.

Demonstration

A machine learning system was trained based on data collected in laboratory settings using a specific data gathering procedure. The laboratory device simulating a heat exchanger was used as the model. The model consisted of a hollow pipe made of acrylic that allows placing acrylic internal pipes to represent the internal structure. In these first experiments, transparent structures were used for easy visual detection of removal of fouling. Data collecting for training the neural network aby repeated experiments consisting of:

a. Placement of pre-specified amount of fouling into one or more target points within a device to be cleaned. Measurements were performed also with devices with no fouling.

b. Performing the cleaning for a fixed amount of time, so that measurement pulses are repeatedly being sent during the ongoing cleaning process. A single experiment produces around 400 individual measurements (timewise, during the cleaning process) each represented by 4 data vectors of 10,000 elements each.

c. Recording of the state of fouling at the end of the experiment.

Figure 9:
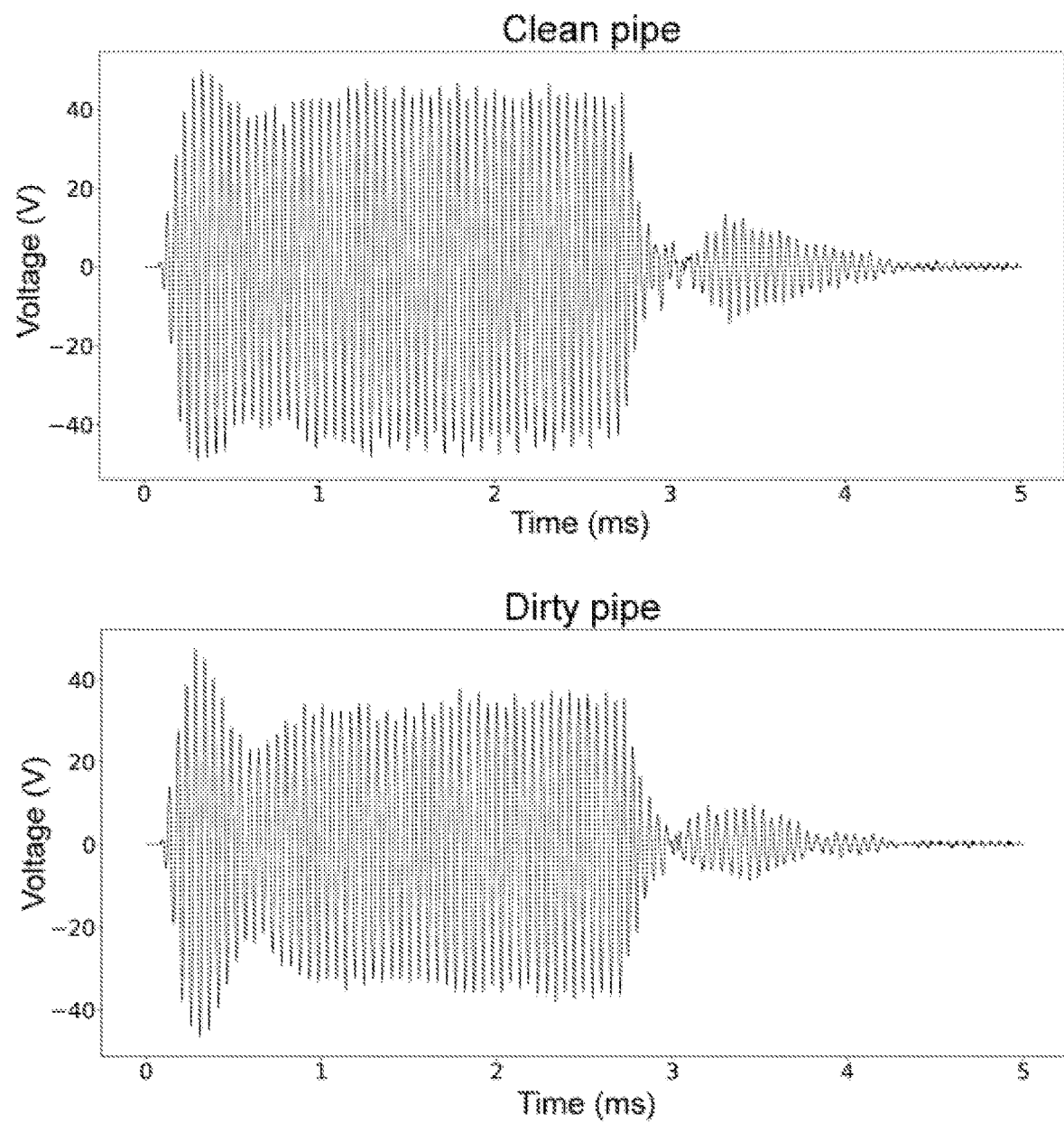
FIG. 9 shows exemplary voltage as a function of time recorded by a transducer attached on the outer wall of a device to be cleaned; top clean device and bottom dirty (fouled) device used for training a neural network used in an exemplary non-limiting method of the present invention.

Exemplary pressure profiles of a device comprising a clean pipe (top) and dirty pipe (bottom) as a function of time is shown in FIG. 9.

The data gathering process provides both measurements with known fouling state (clean structure or measurement at the very beginning of the experiment) and measurements with no accurate ground truth (all measurements while the structure is being cleaned). The neural network was trained by using both types of measurements, using semi-supervised learning strategies to take advantage of the measurements with no ground truth labels.

A practical implementation of the technique was verified for the special case of a) structure with single internal pipe and b) scalar variable indicating the total amount of fouling as the output. According to a preliminary experiment it could be accurately estimate the remaining fouling based on a single measurement pulse, providing an estimate with roughly 15% error margins compared to the true state.

The method described above provides estimates for the current fouling status based on individual measurement pulses. During an ongoing measurement such measurements are made repeatedly. By modeling the temporal progression of the estimates obtained of individual measurements, we can obtain a considerably more accurate estimate of the current fouling state. In the simplest case this could be done by taking a running average of the predicted fouling states.

Figure 10:
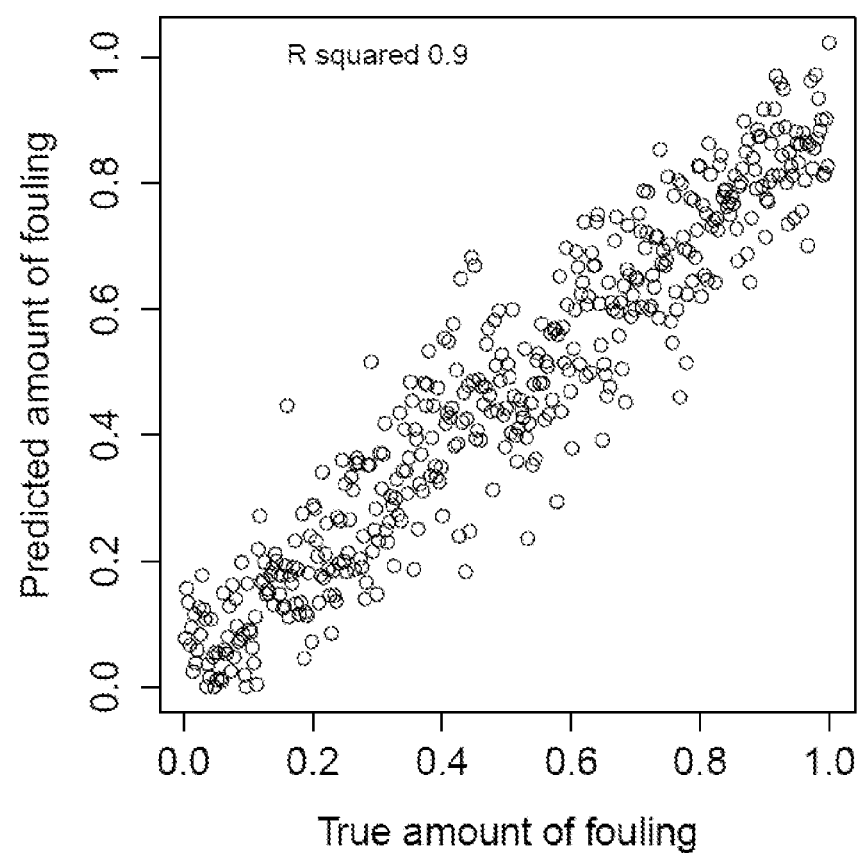
FIG. 10 shows an exemplary fouling prediction based on a single measurement.
Figure 11:
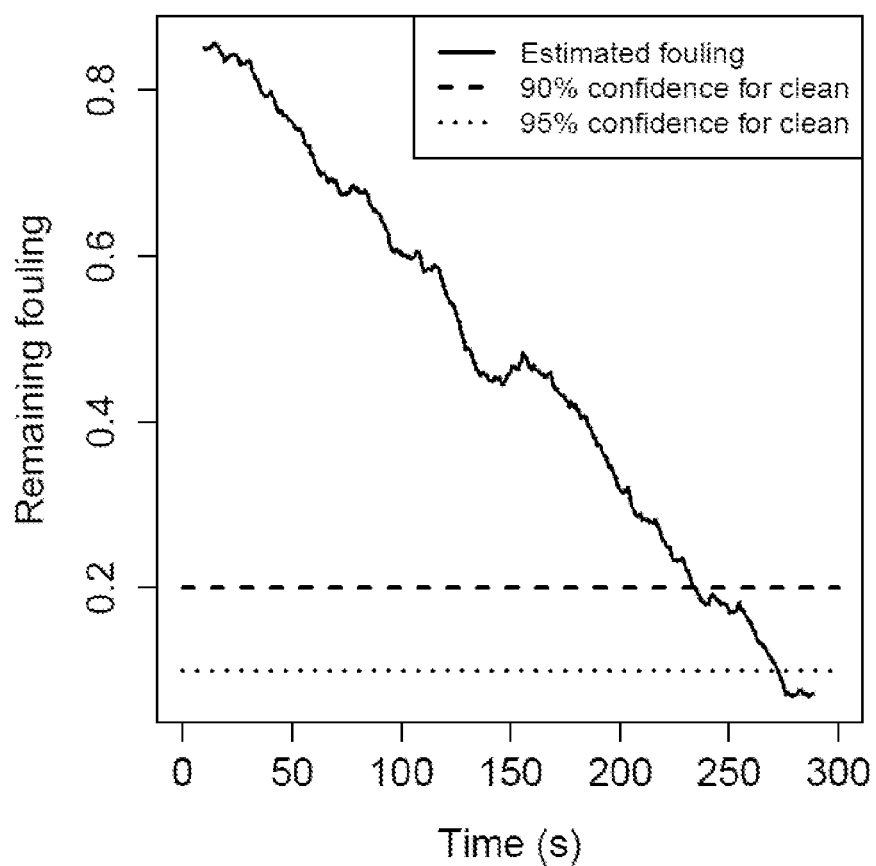
FIG. 11 shows a non-limiting example on monitoring of the cleaning process by using the method of the present invention.

As a concrete demonstration of the above technique, a neural network was trained on a collection of training experiments. The training data consisted of three experiments where a fixed amount of fouling was placed on the surface of an inner structure and the cleaning was carried out for 5 minutes, making 400 measurement recordings during each experiment, and additional 100 measurements for a clean structure. FIG. 10 shows the outputs of the model for 400 measurements recorded during a separate experiment, comparing the true outputs and the predictions. For the measurements of the clean structure, 90% fall below value 0.1, indicating that clean structures are clearly identified. FIG. 11 illustrates how these predictions can be used for monitoring an ongoing cleaning process, and for automatically determining when the structure is clean; if a 90% confidence of cleaning is satisfactory, then this particular cleaning process could have been terminated after 230 seconds. In both plots the axis are normalized so that 1 corresponds to the amount of fouling at the beginning of the experiment.

Given such real-time estimates for the amount of fouling, a technique for automatically determining when the cleaning process should be terminated, has been developed. By monitoring the change in the fouling state, high-confidence decision indicating that the fouling state if no longer changing can be made. Combining this with additional discrete classification of whether the structure is completely clean or not allows:

a. Terminating the cleaning process early to save energy in case completely clean state is reached b. Requesting for change in the cleaning process parameters (power or target location) in case the fouling state no longer changes but the structure is recognized to still be dirty.

As described above, it is preferable that there is no further fouling during the cleaning process, it cannot be completely avoided. However, the method of the present invention is suitable for use in processes wherein some part of the devices is contaminated by fouling during the cleaning process.

Further embodiments of the present invention are disclosed in the following numbered clauses.

1. A system for cleaning of a device for holding fluid, the system comprising transducer controlling means (105) and one or more, preferably at least two transducers (101*a-f*, 201), wherein the one or more transducers are adapted to be positioned on, or in proximity of, outer wall (103*a*) of the device and to emit mechanical waves towards one or more target points (104) within the device, characterized in that the transducer controlling means comprises emitter instructions produced by a machine learning system comprising mechanical waveform data, the transducer controlling means adapted to execute the emitter instructions to the one or more transducers for producing the mechanical waves.

2. The system according to clause 1, wherein the machine learning system is adapted to use simulated time-reversal waveform data from the one or more target points for producing the emitter instructions.

3. The system according to clause 1 or 2, wherein at least one of the one or more transducers is adapted to emit one or more measurement pulses towards the one or more target points, and to receive one of more reflecting measurement pulses from the one or more target points, and/or at least one of the one or more transducers is adapted receive one or more echoes of the plurality of mechanical waves emitted towards the one or more target points, and the mechanical learning system is adapted to process the one or more reflecting measurement pulses and/or the one or more echoes, to indicate fouling status of the device at the one or more target points, and the transducer controlling means is adapted to instruct the one or more transduces using the fouling status.

4. The system according to clause 2 or 3 wherein the simulated time-reversal mechanical waveform data comprises data about geometry of the device, such as one or more of technical drawing, computer assisted design, X-ray image, mechanical wave measurement.

5. The system according to any of clauses 1-4, wherein at least one of the one or more transducers is a chaotic cavity transducer.

6. A method for cleaning a device holding fluid, comprising positioning one or more transducers on, or in proximity of, outer surface of the device, determining one of more target points within the device, the one or more transducers emitting plurality of mechanical waves towards the one or more target points, characterized in that at least one of the one or more transducers emitting one or more measurement pulses towards the one or more target points, and receiving one of more reflecting measurement pulses from the one or more target points, and/or at least one of the one or more transducers receiving one or more echoes of the plurality of mechanical waves emitted towards the one or more target points, processing the one or more reflecting measurement pulses and/or the one or more echoes, using a machine learning system comprising mechanical waveform data of a device to be cleaned, to indicate fouling status of the device at the one or more target points, and instructing the one or more transduces using the fouling status.

7. The method according to clause 6, wherein the instructing comprises moving the one or more transducers on, or in proximity of the outer wall of the device.

8. The method according to clause 6 or 7, wherein the instructing comprises moving the one or more target points within the device.

9. The method according to any of clauses 6-8, wherein the instructing comprises modifying one of more of: waveform shape, waveform focus point, waveform duration, waveform strength.

10. The method according to any of clauses 6-9, wherein the instructing comprises determining number and/or the positioning of the one or more transducers.

11. The method according to any of clauses 6-10, wherein the instructing comprises terminating the emitting.

12. The method according to clauses 6-11, wherein the instructing comprises moving when the fouling status receives a predetermined value at the one or more target points.

13. The method according to any of clauses 6-12, the instructing comprises terminating when the fouling status receives a predetermined value at the one or more target points.

14. The method according to any of clauses 6-13, wherein the one or more measurement pulses are mechanical wave pulses, and duration of the pulses is preferably ≤100 ms, more preferably 0.1-100 ms.

15. The method according to any of clauses 6-14, comprising the one or more transducers measuring one of more amplitude and/or frequency of mechanical wave on the outer wall of the device, processing the one or more amplitude and/or frequency of mechanical wave using a neural network based non-linear measurement amplitude and/or frequency processing algorithm, to indicate fouling status of the device at inner wall of the device, and instructing the one or more first transduces using the fouling status.

16. The method according to any of clauses 8-15 wherein the moving the one or more target points comprises determining one or more further target points within the device, producing simulated time-reversal mechanical waveform data, the producing comprising simulating time-reversal mechanical waveform from the one or more further target points towards the one or more transducers, incorporating the simulated time-reversal mechanical waveform data to the neural network.

The specific examples provided in the description given above should not be construed as limiting the scope and/or the applicability of the appended claims. Lists and groups of examples provided in the description given above are not exhaustive unless otherwise explicitly stated.

What is claimed is:

1. A method for cleaning a device holding fluid comprising steps of:

positioning one or more transducers on, or in proximity of, an outer wall of the device, determining one or more target points within the device, producing emitter instructions using a machine learning system comprising mechanical waveform data about a device to be cleaned, wherein the mechanical waveform data comprises simulated time-reversed mechanical waveform data of an acoustic signal related to the device to be cleaned, the simulated time-reversed mechanical waveform data being a simulation of a time-reversed version of an acoustic signal that would be observed at the one or more transducers from an imaginary phantom source sending a pressure signal from at each of the one or more target points within the device, instructing, based on the emitter instructions, the one or more transducers on an operation of the one or more transducers, and the one or more transducers emitting, based on the instructing, mechanical waves towards the one or more target points, the mechanical waves thereby cleaning the device.

2. The method according to claim 1, wherein at least one of the one or more transducers emitting one or more measurement pulses towards the one or more target points, and receiving one or more reflecting measurement pulses from the one or more target points, and/or at least one of the one or more transducers receiving one or more echoes of the mechanical waves emitted towards the one or more target points, indicating fouling status at the one or more target points by processing the one or more reflecting measurement pulses and/or the one or more echoes, using the machine learning system, and producing the emitter instructions comprises using the fouling status.

3. The method according to claim 1, wherein the simulated time-reversal mechanical waveform data comprises data about geometry of the device.

4. The method according to claim 1, wherein the instructing comprises moving the one or more transducers on, or in proximity of the outer wall of the device.

5. The method according to claim 1, wherein the instructing comprises moving the one or more target points within the device.

6. The method according to claim 1, wherein the instructing comprises modifying at least one of the group consisting of: waveform shape, waveform focus point, waveform duration, and waveform strength.

7. The method according to claim 1, wherein the instructing comprises determining number and/or positioning of the one or more transducers.

8. The method according to claim 1, wherein the instructing comprises terminating the emitting.

9. The method according to claim 1, comprising the one or more transducers measuring one or more mechanical waves along the outer wall of the device, processing the one or more mechanical waves using the machine learning system, to indicate fouling status of the device at inner wall of the device, and producing the emitter instructions comprises using the fouling status.

10. The method according to claim 1,
wherein the device includes one or more internal structures, and
wherein, when the one or more internal structures of the device has been perturbed, the machine learning system produces new emitter instructions to the one or more transducers based on the one or more internal structures of the device having been perturbed.

11. The method according to claim 1, wherein the device is a heat exchanger.

12. A non-transitory computer-readable medium on which is stored a computer program comprising program code, wherein the program code, where executed on a calculating device, causes all the steps of claim 1 to be performed.

13. The method according to claim 1, wherein the simulated time-reversed mechanical waveform data from the one or more target points towards the one or more transducers.

14. The method according to claim 1, wherein the simulated time-reversal mechanical waveform data comprises data about geometry of the device, including at least one of the group consisting of one of technical drawing, computer assisted design, X-ray image, mechanical wave measurement, and fouling status of the device.

15. The method according to claim 2, wherein the one or more measurement pulses are mechanical wave pulses, and a duration of the mechanical wave pulses is <100 ms.

16. The method according to claim 2, wherein the instructing comprises moving the one or more transducers on, or in proximity of the outer wall of the device.

17. The method according to claim 3, wherein the instructing comprises moving the one or more transducers when the fouling status reaches a predetermined value at the one or more target points.

18. The method according to claim 3, wherein the instructing comprises terminating the emitting when the fouling status receives a predetermined value at the one or more target points.

19. The method according to claim 3, wherein the instructing comprises moving the one or more transducers on, or in proximity of the outer wall of the device.

20. The method according to claim 5 wherein the moving the one or more target points comprises
determining one or more further target points within the device,
producing further simulated time-reversal mechanical waveform data, the producing of the further simulated time-reversal mechanical waveform data comprising producing a simulating time-reversal mechanical waveform from each of the one or more further target points directed towards the one or more transducers, and
incorporating the further simulated time-reversal mechanical waveform data from the one or more further target points into the machine learning system to produce further emitter instructions.

* * * * *